US008933177B2

(12) United States Patent
Hori et al.

(10) Patent No.: US 8,933,177 B2
(45) Date of Patent: Jan. 13, 2015

(54) RELEASE MODIFIER AND RELEASE COATING ORGANOPOLYSILOXANE COMPOSITION

(75) Inventors: Seiji Hori, Sabae (JP); Takateru Yamada, Ichihara (JP); Chung Mien Kuo, Taipei (TW)

(73) Assignee: Dow Corning Toray Company, Ltd., Chiyoda-Ku, Tokyo (JP)

( * ) Notice: Subject to any disclaimer, the term of this patent is extended or adjusted under 35 U.S.C. 154(b) by 984 days.

(21) Appl. No.: 13/003,427

(22) PCT Filed: Jul. 9, 2009

(86) PCT No.: PCT/JP2009/062852
§ 371 (c)(1),
(2), (4) Date: Mar. 16, 2011

(87) PCT Pub. No.: WO2010/005113
PCT Pub. Date: Jan. 14, 2010

(65) Prior Publication Data
US 2011/0160376 A1    Jun. 30, 2011

(30) Foreign Application Priority Data

Jul. 11, 2008    (JP) ................................. 2008-180979

(51) Int. Cl.
C08L 83/04    (2006.01)
C08G 77/44    (2006.01)
C09D 183/04    (2006.01)

(52) U.S. Cl.
CPC .............. *C08G 77/44* (2013.01); *C09D 183/04* (2013.01)
USPC ........... 525/477; 524/268; 524/474; 524/588; 525/478; 528/15; 528/31; 528/32; 428/447

(58) Field of Classification Search
None
See application file for complete search history.

(56) References Cited

U.S. PATENT DOCUMENTS

| 4,310,678 | A | | 1/1982 | Blizzard et al. | |
|---|---|---|---|---|---|
| 5,198,476 | A | | 3/1993 | Kobayashi et al. | |
| 6,124,419 | A | * | 9/2000 | Armstrong et al. | ............. 528/15 |
| 2005/0282977 | A1 | * | 12/2005 | Stempel et al. | ............... 525/477 |
| 2007/0087207 | A1 | | 4/2007 | Irifune | |
| 2007/0275255 | A1 | | 11/2007 | Ooms et al. | |

FOREIGN PATENT DOCUMENTS

| CA | 2017906 | A1 | | 11/1990 |
|---|---|---|---|---|
| EP | 0400614 | | * | 5/1990 |
| EP | 1783186 | A2 | | 5/2007 |
| JP | 52086985 | A | | 7/1977 |
| JP | 57029676 | A | | 2/1982 |
| JP | 59084935 | A | | 5/1984 |
| JP | 63017290 | B | | 4/1988 |
| JP | 1215857 | A | | 8/1989 |
| JP | 2269157 | A | | 11/1990 |
| JP | 3002270 | A | | 1/1991 |
| JP | 4226120 | A | | 8/1992 |
| JP | 08217980 | | | 8/1996 |
| JP | 10110156 | | | 4/1998 |
| JP | 11106703 | | | 4/1999 |
| JP | 2007106908 | A | | 4/2007 |
| JP | 2008013613 | | | 1/2008 |
| WO | WO 2005/063890 | A2 | * | 7/2005 |

OTHER PUBLICATIONS

English language abstract and translation for JP 08217980 extracted from the PAJ database on Jul. 14, 2011, 39 pages.
English language abstract and translation for JP 10110156 extracted from the PAJ database on Jul. 14, 2011, 41 pages.
English language abstract and translation for JP 11106703 extracted from the PAJ database on Jul. 14, 2011, 36 pages.
English language abstract for JP 1215857 extracted from the espacenet.com database on Jul. 14, 2011, 8 pages.
English language abstract for JP 2269157 extracted from the espacenet.com database on Jul. 14, 2011, 5 pages.
English language abstract for JP 3002270 extracted from the espacenet.com database on Jul. 14, 2011, 9 pages.
English language abstract for JP 4226120 extracted from the espacenet.com database on Jul. 14, 2011, 10 pages.
English language abstract for JP 52086985 extracted from the espacenet.com database on Jul. 14, 2011, 6 pages.
English language abstract for JP 59084935 extracted from the espacenet.com database on Jul. 14, 2011, 4 pages.
English language abstract not available for JP 63017290. However, see English language equivalent US 4310678 extracted from the espacenet.com database on Nov. 29, 2011._pages.
English language abstract for JP 2007106908 extracted from the espacenet.com database on Jul. 14, 2011, 16 pages.
English language abstract and translation for JP 2008013613 extracted from the PAJ database on Jul. 14, 2011, 30 pages.
International Search Report for Application No. PCT/JP2009/062852 dated Sep. 29, 2009, 3 pages.

* cited by examiner

*Primary Examiner* — Marc Zimmer
(74) *Attorney, Agent, or Firm* — Howard & Howard Attorneys PLLC

(57) ABSTRACT

To provide a release modifier which provides a heavy release force to a cured release layer of silicone coating composition. The release modifier comprises an organopolysiloxane resin-organopolysiloxane condensation reaction product that is obtained by the condensation reaction of (a1) 100 weight parts of MQ-type organopolysiloxane resin in which the molar ratio of the M unit to the Q unit is 0.6 to 1.0 and the content of the hydroxyl group or alkoxy group is 0.3 to 2.0 weight % with (a2) 20 to 150 weight parts of chain-form diorganopolysiloxane that has an average degree of polymerization of 100 to 1000 and at least one hydroxyl group or alkoxy group; this organopolysiloxane resin-organopolysiloxane condensation reaction product preferably has a prescribed hydroxyl group content.

10 Claims, No Drawings

RELEASE MODIFIER AND RELEASE COATING ORGANOPOLYSILOXANE COMPOSITION

RELATED APPLICATIONS

This application claims priority to and all the advantages of International Patent Application No. PCT/JP2009/062852, filed on Jul. 9, 2009, which claims priority to Japanese Patent Application No. JP2008-180979, filed on Jul. 11, 2008.

TECHNICAL FIELD

The present invention relates to a release modifier, a release modifier composition, a cured release coating organopolysiloxane composition that uses this release modifier or release modifier composition, and a sheet-form substrate that has a cured release coating layer formed by the cure of this release coating organopolysiloxane composition.

BACKGROUND ART

Cured release coating layer-forming organopolysiloxane compositions, by forming a cured release coating when cured on the surface of a substrate, e.g., various types of paper, synthetic films, fibers, textiles, and so forth, are able to impart thereto nonadhesiveness, i.e., releasability, versus tacky substances and for this reason are widely used in the production of pressure-sensitive adhesive tapes and various types of labels.

These cured release coating layer-forming organopolysiloxane compositions must exhibit, inter alia, the following properties: the cured coating layer formed by the cure of the composition must not have a negative influence on the pressure-sensitive adhesive layer, i.e., the components of the coating must not migrate to the pressure-sensitive adhesive layer (this is evaluated via, for example, the residual adhesiveness of the pressure-sensitive adhesive layer), and the cured coating must exhibit releasability. The releasability exhibited by the cured coating is a particularly important requirement with regard to the specifications of pressure-sensitive adhesive tapes and labels, and different release force levels must be provided as a function of the particular application. In addition, the thusly modified release force must also be stable and must not undergo timewise variations. The temporal stability of the release force is a particularly important problem when a medium to heavy release force is required.

Within the sphere of technology for adjusting the release force of the cured coating, methods have been disclosed for obtaining a heavier release by adding a tacky polyorganosiloxane resin component to an addition reaction-curable organopolysiloxane composition that itself provides a light release force (refer to Patent References 1 to 6). The addition, for example, of hydroxyl-containing polydimethylsiloxane has also been proposed as method of providing a lighter release (Patent Reference 7).

Similarly, in the field of silicone pressure-sensitive adhesives that form a silicone adhesive layer on a substrate by an addition reaction cure, art is already known in which the condensation product of a hydroxyl-functional polyorganosiloxane resin component with a hydroxyl-functional polydimethylsiloxane is used to raise the tackiness (Patent References 8 and 9).

Art is likewise already known in which the condensation product of a hydroxyl-functional polyorganosiloxane resin component with a hydroxyl-functional polydimethylsiloxane is incorporated into a textile printing glue or a cured release coating-forming organopolysiloxane composition, and it is also known that the resulting compositions exhibit appropriate releasabilities (Patent References 10 and 11).

The art is also known of incorporating, as a heavy release control agent, the partial condensation product of an alkenyl-functional organopolysiloxane with a hydroxyl-functional polyorganosiloxane resin component that contains the tetrafunctional or trifunctional unit (Patent Reference 12) or the condensation product of an organohydrogenpolysiloxane with a hydroxyl-functional polyorganosiloxane resin component that contains the tetrafunctional unit (Patent Reference 13).

However, the coatings yielded by the compositions cited above have not exhibited a satisfactory temporal stability by the modified release force, and as a result the release force lightens with the passage of time. In addition, with regard to the art of incorporating a known condensation product of a hydroxyl-functional polyorganosiloxane resin component with a hydroxyl-functional polydimethylsiloxane in order to generate a heavy release behavior, the release modifier-containing composition is prone to exhibit an increased viscosity. Another problem here has been migration of coating components into the pressure-sensitive adhesive layer, causing a rise in the residual adhesiveness of the pressure-sensitive adhesive layer. Moreover, during release of the pressure-sensitive adhesive, release from the pressure-sensitive adhesive surface may not proceed smoothly when the release velocity is increased. Microadjustment of the release force is quite difficult with these release modifiers and cured release products, and there has been desire from a practical standpoint for a release modifier that would provide the ability to microadjust the release force. Furthermore, the alkenyl-functional MQ resin used as a starting material is also relatively expensive, and this has created desire for a release modifier that can be provided less expensively in mass quantities.

[Patent Reference 1] JP 52-086985 A
[Patent Reference 2] JP 59-084935 A
[Patent Reference 3] JP 01-215857 A
[Patent Reference 4] JP 03-002270 A
[Patent Reference 5] JP 04-226120 A
[Patent Reference 6] JP 11-106703 A
[Patent Reference 7] JP 08-217980 A
[Patent Reference 8] JP 02-269157 A
[Patent Reference 9] JP 10-110156 A
[Patent Reference 10] JP 57-029676 A
[Patent Reference 11] JP 2008-013613 A
[Patent Reference 12] JP 2007-106908 A
[Patent Reference 13] JP 63-017290 A

SUMMARY OF INVENTION

Technical Problems to be Solved

The present invention was pursued in order to solve the problems identified above. An object of the present invention is to provide a release modifier that uses readily available raw materials, that provides facile modification of the release force, and that, when incorporated into an addition curing-type release coating organopolysiloxane composition, provides a heavy release effect, exhibits little migration of coating components into pressure-sensitive adhesive layers, and provides a low viscosity and excellent handling properties.

As a result of intensive and extensive investigations in order to achieve the aforementioned object, the inventor discovered that a high residual adhesiveness and an excellent capacity to generate a heavier release force can be obtained by the use of small amounts of a release modifier comprising the organopolysiloxane resin-organopolysiloxane condensation reaction product obtained by a condensation reaction between specific quantities of organopolysiloxane resin essentially comprising M and Q units and straight-chain or branched-chain diorganopolysiloxane that has a degree of polymerization of 10 to 1000 and that has hydroxyl or alkoxy in the molecule. The present invention was achieved based on this discovery.

Solution to Problems

The present invention was also achieved based on the discovery by the inventor that a particularly good heavy release effect can be generated when this condensation reaction product has a hydroxyl group content in the range of 0.05 to 0.80 weight % and more preferably 0.10 to 0.60 weight %. The present invention was also achieved based on the discovery by the inventor that this hydroxyl group content can be easily controlled by adjusting the molar ratio between component (a1) and component (a2) or by treating the condensation reaction product with a silylating agent (e.g., a silazane compound), thereby enabling the production of a release modifier that has an excellent heavy release effect. The present invention was also achieved based on the discovery by the inventor that a release modifier composition that uses a straight-chain or branched olefin is useful for providing even greater improvements in the viscosity and release properties of the instant release modifier.

The aforementioned objects are achieved by

"[1] A release modifier comprising an organopolysiloxane resin-organopolysiloxane condensation reaction product obtained by the condensation reaction of
  (a1) 100 weight parts of organopolysiloxane resin essentially comprising the $R^1_3SiO_{1/2}$ unit (each $R^1$ in the formula is independently a hydroxyl group, $C_{1-6}$ alkoxy group, or $C_{1-10}$ substituted or unsubstituted monovalent hydrocarbyl group) and $SiO_{4/2}$ unit, wherein the molar ratio of the $R^1_3SiO_{1/2}$ unit to the $SiO_{4/2}$ unit is 0.6 to 1.0 and the content of the hydroxyl group or alkoxy group is 0.3 to 2.0 weight % with
  (a2) 20 to 150 weight parts of straight-chain or branched-chain diorganopolysiloxane that has an average degree of polymerization of 100 to 1000 and that has at least one hydroxyl group or $C_{1-6}$ alkoxy group in each molecule in the presence of
  (a3) a condensation reaction catalyst.
[2] The release modifier according to [1], characterized in that the hydroxyl group content of the organopolysiloxane resin-organopolysiloxane condensation reaction product is 0.05 to 0.80 weight %.
[3] The release modifier according [1] to [2], comprising an organopolysiloxane resin-organopolysiloxane condensation reaction product that is obtained by the condensation reaction of 100 weight parts of component (a1) and 30 to 100 weight parts of component (a2) in the presence of component (a3) and that has a hydroxyl group content of 0.10 to 0.60 weight %.
[4] The release modifier according to any of [1] to [3], comprising an organopolysiloxane resin-organopolysiloxane condensation reaction product obtained by condensation reacting 100 weight parts of component (a1) with 20 to 150 weight parts of component (a2) in the presence of component (a3) and thereafter reacting with 0.1 to 10.0 weight parts of (a4) at least one type of silylating agent.
[5] The release modifier according to any of [1] to [4], wherein component (a2) is a straight-chain diorganopolysiloxane that has two hydroxyl groups in both molecular chain terminals and that is represented by the following structural formula

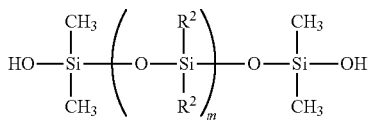

(in the formula, each $R^2$ is independently the hydroxyl group, $C_{1-6}$ alkoxy, or $C_{1-10}$ substituted or unsubstituted monovalent hydrocarbyl that does not contain a carbon-carbon double bond, and m is a number from 200 to 800).
[6] The release modifier according to [4], characterized in that component (a4) is a silazane compound and the organopolysiloxane resin-organopolysiloxane condensation reaction product yielded by the reactions has a hydroxyl group content of 0.10 to 0.60 weight %.
[7] A release modifier composition comprising 100 weight parts of the release modifier comprising organopolysiloxane resin-organopolysiloxane condensation reaction product according to any of [1] to [6] and 0.1 to 50 weight parts of at least one type of olefin represented by the following structural formula (1) or (2)

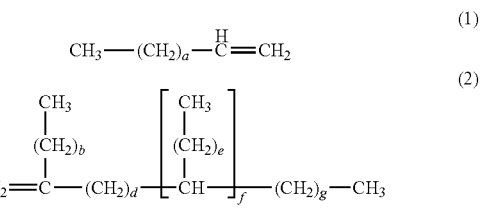

(in the formula, a is a number from 1 to 27; d and f are each independently a number from 0 to 20; b and e are each independently a number from 1 to 12; and g is a number from 3 to 14).
[8] A release coating organopolysiloxane composition characteristically comprising
  (A) 1 to 20 weight parts of the release modifier according to any of claims 1 to 6 or the release modifier composition according to claim 7,
  (B) 95 to 70 weight parts of organopolysiloxane that contains at least two silicon-bonded alkenyl groups in each molecule,
  (C) organohydrogenpolysiloxane that has at least two silicon-bonded hydrogen atoms in each molecule, in an amount that provides a value of 0.3 to 5.0 for the molar ratio between the [silicon-bonded hydrogen in component (C)] and the [alkenyl group in component (B)], and
  (D) a catalytic quantity of a platinum hydrosilylation reaction catalyst.
[9] The cured release coating organopolysiloxane composition according to [8], wherein the viscosity of component (B) at 25° C. is 50 to 2000 mPa·s and the composition is a solventless composition.
[10] The release coating organopolysiloxane composition according to [8], that further comprises (E) 10 to 3000 weight parts of organic solvent.
[11] A sheet-form substrate having a cured release coating layer obtained by the cure of the release coating organopolysiloxane composition according to any of claims [8] to [10]."

Advantageous Effects of Invention

The present invention provides a release modifier and a release modifier composition that use readily available raw materials, that provide facile modification of the release force, and that—when incorporated into an addition curing-type cured release coating-forming organopolysiloxane composition—provide excellent heavy release properties, exhibit little migration of coating components into pressure-sensitive adhesive layers, and provide a low viscosity and excellent handling properties. The present invention also provides a cured release coating layer-forming organopolysiloxane composition (i.e. a release coating organopolysiloxane composition) that incorporates this release modifier or release modifier composition.

DESCRIPTION OF EMBODIMENTS

The release modifier according to the present invention comprises an organopolysiloxane resin-organopolysiloxane condensation reaction product obtained by the condensation reaction of (a1) 100 weight parts of organopolysiloxane resin essentially comprising the $R^1_3SiO_{1/2}$ unit (each $R^1$ in the formula is independently a hydroxyl group, $C_{1-6}$ alkoxy group, or $C_{1-10}$ substituted or unsubstituted monovalent hydrocarbyl) and $SiO_{4/2}$ unit, wherein the molar ratio of the $R^1_3SiO_{1/2}$ unit to the $SiO_{4/2}$ unit is 0.6 to 1.0 and the content of the hydroxyl group or alkoxy group is 0.3 to 2.0 weight % with (a2) 20 to 150 weight parts of straight-chain or branched-chain diorganopolysiloxane that has an average degree of polymerization of 100 to 1000 and that has at least one hydroxyl group or $C_{1-6}$ alkoxy group in each molecule in the presence of (a3) a condensation reaction catalyst.

Viewed from the standpoint of the heavy release properties, the hydroxyl group content in the aforementioned condensation reaction product comprising this release modifier is preferably 0.05 to 0.80 weight % and more preferably 0.10 to 0.60 weight %.

The organopolysiloxane resin-organopolysiloxane condensation reaction product comprising the release agent under consideration is preferably obtained in the present invention by adjusting the hydroxyl group content through the condensation reaction of 100 weight parts of component (a1) with 30 to 100 weight parts of component (a2) in the presence of component (a3). This organopolysiloxane resin-organopolysiloxane condensation reaction product can also be obtained by following the condensation reaction between components (a1) and (a2) with a reaction with 0.1 to 10.0 weight parts of (a4) at least one type of silylating agent. The release modifier according to the present invention is described more specifically in the following.

Component (a1) is an MQ-type organopolysiloxane resin that has an M unit-to-Q unit ratio in a specific range and that contains a specific amount of hydroxyl or alkoxy. More specifically, component (a1) is an organopolysiloxane resin that essentially comprises the $R^1_3SiO_{1/2}$ unit and $SiO_{4/2}$ unit wherein the molar ratio of the $R^1_3SiO_{1/2}$ unit to the $SiO_{4/2}$ unit is 0.6 to 1.0 and that has an hydroxyl group or alkoxy group content in the range of 0.3 to 2.0 weight %.

Each $R^1$ in the formula is independently the hydroxyl group, $C_{1-6}$ alkoxy, or $C_{1-10}$ substituted or unsubstituted monovalent hydrocarbyl. This hydroxyl group is a silicon-bonded hydroxyl group, that is, the silanol (—OH) group. The $C_{1-6}$ alkoxy can be exemplified by methoxy, ethoxy, propoxy, and butoxy. There are no particular limitations on the $C_{1-10}$ substituted or unsubstituted monovalent hydrocarbyl, but this is preferably an unreactive monovalent hydrocarbyl group free of the carbon-carbon double bond. This monovalent hydrocarbyl can be exemplified by alkyl such as methyl, ethyl, propyl, butyl, hexyl, heptyl, octyl, nonyl, decyl, and so forth; aryl such as phenyl, tolyl, xylyl, and so forth; aralkyl such as benzyl, phenethyl, and so forth; halogenated alkyl such as 3-chloropropyl, perfluoroalkyl (for example, 3,3,3-trifluoropropyl and pentafluorobutyl), and so forth; as well as perfluoroetherified alkyl and cyanoethyl. Methyl, phenyl, and perfluoroalkyl groups are preferred from the standpoints of ease of synthesis and the release properties.

Component (a1) is an MQ-type organopolysiloxane resin that essentially comprises the M unit represented by $R^1_3SiO_{1/2}$ and the Q unit represented by $SiO_{4/2}$ wherein the molar ratio of the $R^1_3SiO_{1/2}$ unit to the $SiO_{4/2}$ unit is 0.6 to 1.0 and preferably is 0.65 to 0.90 and more preferably is 0.70 to 0.80. A molar ratio below the indicated lower limit results in a reduced compatibility with the other siloxane components upon incorporation in a cured release coating layer-forming organopolysiloxane composition. When, on the other hand, the upper limit is exceeded, this has the effect of causing the heavy release properties and particularly the initial heavy release behavior to be unsatisfactory. This organopolysiloxane resin undergoes a condensation reaction with component (a2), vide infra, and characteristically has a hydroxyl group or alkoxy group content in the molecule in the range of 0.3 to 2.0 weight %. The hydroxyl group or alkoxy group content in component (a1) is preferably 0.4 to 1.0 weight % and more preferably is 0.5 to 0.9 weight %. It is particularly preferred for the present invention that component (a1) contain 0.5 to 0.8 weight % hydroxyl group. When the hydroxyl or alkoxy group content in component (a1) is below the indicated lower limit, the condensation reaction with component (a2) will be inadequate and the heavy release properties of the obtained release modifier may be unsatisfactory. When, on the other hand, the hydroxyl or alkoxy group content of component (a1) exceeds the indicated upper limit, problems such as a sticky residue of the obtained release modifier may then occur.

Component (a2) is straight-chain or branched-chain diorganopolysiloxane that has an average degree of polymerization of 100 to 1000 and that has at least one hydroxyl group or $C_{1-6}$ alkoxy group in each molecule, and, through its condensation reaction with the hydroxyl or alkoxy in component (a1), forms the organopolysiloxane resin-organopolysiloxane condensation reaction product that is the release modifier according to the present invention. Component (a2) must have at least one hydroxyl group or $C_{1-6}$ alkoxy group in each molecule and, viewed from the standpoint of reactivity, preferably has at least two hydroxyl or $C_{1-6}$ alkoxy groups in molecular chain terminal position. Component (a2) is particularly preferably straight-chain diorganopolysiloxane because this provides an excellent properties of heavy release force and enables stable production of the release modifier.

The average degree of polymerization of component (a2) must be 100 to 1000 in the present invention and more preferably is 150 to 900 and most preferably is 200 to 800. When the average degree of polymerization of component (a2) exceeds the indicated upper limit, the release modifier yielded by the condensation reaction with component (a1) assumes an extremely high viscosity, which is impractical because this impairs incorporation in particular into a solventless release modifier composition and prevents the use of ordinary coating equipment to apply the release modifier composition on substrate. When the average degree of polymerization of component (a2) is less than the indicated lower limit, the condensation reaction product gels and the desired release modifier cannot be obtained.

Component (a2) is preferably a straight-chain diorganopolysiloxane that has both molecular chain terminals chain-stopped by the hydroxyl group and that is represented by the following structural formula.

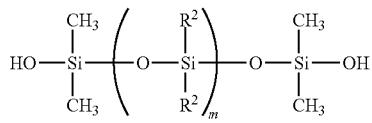

In the formula, each $R^2$ is independently the hydroxyl group, $C_{1-6}$ alkoxy, or unreactive $C_{1-10}$ substituted or unsubstituted monovalent hydrocarbyl that does not contain a carbon-carbon double bond. The monovalent hydrocarbyl encompassed by $R^2$ can be exemplified by alkyl groups such as methyl, ethyl, propyl, butyl, hexyl, heptyl, octyl, nonyl, decyl, and so forth; aryl such as phenyl, tolyl, xylyl, and so forth; aralkyl such as benzyl, phenethyl, and so forth; halogenated alkyl such as 3-chloropropyl, perfluoroalkyl (for example, 3,3,3-trifluoropropyl and pentafluorobutyl), and so forth; as well as perfluoroetherified alkyl and cyanoethyl. Methyl, phenyl, and perfluoroalkyl groups are preferred from the standpoints of ease of synthesis and the release properties. In particular, preferably at least 90 mol % of $R^2$ is methyl group and most preferably at least 95 mol % of $R^2$ is methyl group.

The subscript m, which is the average degree of polymerization of the straight-chain diorganopolysiloxane that has both molecular chain terminals chain-stopped by the hydroxyl group and that is represented by the structural formula given above, is a number in the range from 200 to 800; this offers the advantages of ease of handling due to the low viscosity of the resulting release modifier and the ability to carry out stable production due to an inhibition of gelation during the condensation reaction. The most preferred range for the value of the average degree of polymerization m in the present invention is 250 to 750.

The release modifier of the present invention can be obtained by carrying out a condensation reaction between 100 weight parts of the previously described organopolysiloxane resin comprising component (a1) and 20 to 150 weight parts of the diorganopolysiloxane comprising component (a2) in the presence of the condensation reaction catalyst (a3). In order to stably produce a release modifier that exhibits excellent heavy release properties, the component (a1)/component (a2) reaction weight ratio must be from 1/0.2 to 1/1.5 and particularly preferably is from 1/0.3 to 1/1.0. Thus, the condensation reaction is particularly preferably carried out between 100 weight parts of component (a1) and 30 to 100 weight parts of component (a2) in the presence of the condensation reaction catalyst (a3); this enables the facile production of an organopolysiloxane resin-organopolysiloxane condensation reaction product that has a hydroxyl group content from 0.10 to 0.60 weight % and that exhibits excellent heavy release properties.

The heavy release effect exhibited by the release modifier is unsatisfactory when the component (a1)/component (a2) reaction weight ratio is lower than the previously indicated lower limit or is greater than or equal to 1/2.0. On the other hand, when this reaction weight ratio is in the range from above the previously indicated upper limit to less than 1/2.0, i.e., in the range of 1/1.5<"component (a1)/component (a2) reaction weight ratio"<1/2.0, gelation may occur during the condensation reaction and the desired release modifier is then not obtained.

Component (a3) is a condensation reaction catalyst that promotes the condensation reaction between components (a1) and (a2). This condensation reaction-promoting catalyst can be one or more condensation catalysts selected from acids, bases, the metal salts of organic acids, and so forth, while the condensation catalyst is preferably selected from ammonia (gas), aqueous ammonia, sodium hydroxide, barium hydroxide, amines, organic amine/carboxylic acid salts, quaternary ammonium salts, carboxylic acids, and metal salts of carboxylic acids. In particular, the use of volatile ammonia, amine, or the like offers the advantage of easy removal of the condensation reaction catalyst from the reaction system—and thus easy termination of the reaction—by the application of heat and reduced pressure after the condensation reaction.

Amines preferred for component (a3) of the present invention can be exemplified by primary amines such as methylamine, ethylamine, propylamine, hexylamine, butanolamine, and butylamine; secondary amines such as dimethylamine, diethylamine, diethanolamine, dipropylamine, dibutylamine, dihexylamine, ethylamylamine, imidazole, and propylhexylamine; tertiary amines such as trimethylamine, triethylamine, tripropylamine, tripropanolamine, pyridine, N-methylimidazole, and methylpropylhexylamine; amine compounds such as dodecylamine phosphate, tetramethylguanidine, and diazabicyclononane; and salts of the preceding. Organic amine/carboxylic acid salts preferred for component (a3) can be exemplified by diethylammonium acetate, butylammonium octoate, n-hexylammonium 2-ethylhexanoate, and trimethylammonium laurate.

Preferred quaternary ammonium salts can be exemplified by tetramethylammonium acetate, methylethyldibutylammonium chloride, dioctadecyldimethylammonium chloride, and tetramethylguanidine 2-ethylhexanoate. Preferred carboxylic acids can be exemplified by acetic acid, propionic acid, butanoic acid, formic acid, stearic acid, tetradecanoic acid, hexadecanoic acid, dodecanoic acid, decanoic acid, 3,6-dioxaheptanoic acid, and 3,6,9-trioxadecanoic acid. Metal carboxylates where the metal is selected from the group consisting of Li, Na, K, Ce, and Ca can also be used, and examples here are potassium formate and potassium acetate.

The hydroxyl group content in the organopolysiloxane resin-organopolysiloxane condensation reaction product comprising the release modifier of the present invention is preferably in the range from 0.05 to 0.80 weight %, more preferably 0.10 to 0.60 weight %, and most preferably 0.20 to 0.50 weight %. Keeping the hydroxyl group content in the condensation reaction product in the indicated range results in the release modifier of the present invention having excellent heavy release properties and improves the compatibility with the other siloxane components upon incorporation in a cured release coating layer-forming organopolysiloxane composition and thus enables the preparation of a uniform composition. Another result is that the cured release coating layer yielded by the cure of such a composition exhibits improved release properties and an improved residual adhesiveness. On the other hand, when the hydroxyl content in the condensation reaction product exceeds the indicated upper limit, separation of the release modifier from the siloxane component in the bath may occur. When his hydroxyl group content is less than the indicated lower limit, heavy release properties may not be exhibited unless large amounts of the release modifier are incorporated into the cured release coating layer-forming organopolysiloxane composition.

The hydroxyl group content in the aforementioned condensation reaction product can also be controlled through the reaction weight ratio, the reaction time, and selection of the type of organopolysiloxane resin comprising component (a1) and the diorganopolysiloxane comprising component (a2).

An organopolysiloxane resin-organopolysiloxane condensation reaction product having the prescribed hydroxyl group content can also be obtained by following the component (a1)/component (a2) condensation reaction in the presence of the condensation reaction catalyst (a3) with a reaction with at least one type of silylating agent (a4). The use of this at least one type of silylating agent (a4) is effective for enabling facile adjustment of the hydroxyl group content of the condensation reaction product and thereby obtaining a release modifier that exhibits excellent heavy release properties and an excellent compatibility with the other siloxane components in the bath, The at least one type of silylating agent comprising component (a4)—by functioning to adjust the hydroxyl group content in the condensation reaction product through the introduction of a silyl group, such as the strongly hydrophobic trimethylsilyl group, at a portion of the hydroxyl groups in the condensation reaction product—is used for the purpose of generating stable heavy release properties as well as improving the compatibility with the other hydrophobic siloxane components and thereby inhibiting separation of the release modifier from the siloxane components in the bath. The quantity of use of component (a4) can be selected as appropriate in correspondence to the reaction weight ratio between components (a1) and (a2), the desired heavy release effect, and so forth. However, component (a4) is preferably used at 0.1 to 10.0 weight parts per 100 weight parts of component (a1) and is more preferably used at 1 to 8.0 weight parts per 100 weight parts of component (a1).

The at least one type of silylating agent (a4) is preferably a trialkylsilylating agent and based on ease of acquisition is particularly preferably a trimethylsilylating agent. Such a silylating agent can be specifically and preferably exemplified by a silazane compound represented by the formula $((CH_3)_3Si)_2NR$ (R in the formula is hydrogen or lower alkyl) and can be more specifically exemplified by silazane compounds such as hexamethyldisilazane, N-methylhexamethyldisilazane, N-ethylhexamethyldisilazane, hexamethyl-N-propyldisilazane, and so forth. The use of hexamethyldisilazane is particularly preferred in the present invention for its good reactivity.

Other useable trimethylsilylating agents are silane compounds represented by the formula $(CH_3)_3SiY$ (in the formula, Y is a group selected from halogen atoms, —OH, —OR, and —NR$_2$ (R is defined as above)). This is more specifically exemplified by trimethylchlorosilane, trimethylsilanol, methoxytrimethylsilane, ethoxytrimethylsilane, propoxytrimethylsilane, dimethylaminotrimethylsilane, diethylaminotrimethylsilane, and so forth. The use of trimethylsilanol is particularly preferred because it provides an excellent reactivity.

The release modifier according to the present invention can be synthesized by dissolving components (a1) and (a2) in the desired weight ratio in organic solvent and mixing to homogeneity; thereafter adding a catalytic quantity of the condensation reaction catalyst (a3) (e.g., aqueous ammonia); and reacting for a prescribed temperature and time. The reaction temperature is generally room temperature (25° C.) to 80° C. and the reaction time is generally 0.5 to 10 hours, although these parameters will depend, inter alia, on the reaction scale.

After the reaction, the desired release modifier comprising the component (a1)/component (a2) condensation reaction product can be obtained by removing components such as the water of condensation and ammonia by raising the temperature to the reflux temperature of the organic solvent. After removal of the components such as the water of condensation and ammonia, the hydroxyl group content in the condensation reaction product can be adjusted by adding at least one type of silylating agent (component a(4)) and carrying out a reaction at 70 to 90° C. and more preferably at around 85° C., thereby yielding a release modifier that exhibits the desired heavy release properties.

In the case of incorporation into a solventless-type cured release coating layer-forming organopolysiloxane composition, polysiloxane adapted to the desired viscosity is preferably added as a viscosity modifier to the obtained release modifier to produce the desired product. Viewed from the perspective of the blending stability, this polysiloxane can be exemplified by cyclic polysiloxanes, straight-chain or branched dimethylpolysiloxanes (chain-stopped at the molecular chain terminals by alkenyldimethylsiloxy, trimethylsiloxy, dimethylmonohydroxysiloxy, or dimethylmonoalkoxysiloxy), and mixtures of the preceding, that have a viscosity at 25° C. of 0.65 to 1,000 mPa·s. Preferred examples are cyclic methylpolysiloxane having a degree of polymerization of 3 to 7 and comprising the siloxane unit and straight-chain dimethylpolysiloxane having a viscosity at 25° C. of 5 to 500 mPa·s. A particularly preferred example is straight-chain dimethylpolysiloxane chain-stopped at the molecular chain terminals by alkenyldimethylsiloxy, which is also a component (B) of the cured release coating layer-forming organopolysiloxane composition described below. An even more specific example is alkenyldimethylsiloxy chain-stopped straight-chain dimethylpolysiloxane as represented by the formula $M^{Ra}D_pM^{Ra}$ where $M^{Ra}$ is the monofunctional alkenyldimethylsiloxy group represented by $(CH_3)_2(Ra)SiO_{1/2}$; Ra is $C_{2-8}$ alkenyl; D is the difunctional siloxane unit represented by $(CH_3)_2SiO_{2/2}$; and p is a number in the range from 5 to 200. Ra is preferably vinyl or hexenyl and p is particularly preferably a number in the range from 20 to 100.

In the case of incorporation into a solvent-based cured release coating layer-forming organopolysiloxane composition, an organic solvent adapted to the desired viscosity is added to the obtained release modifier to give the desired product. The organic solvent can be exemplified by aromatic hydrocarbon solvents such as toluene, xylene, and so forth; aliphatic hydrocarbon solvents such as hexane, octane, isoparaffin, and so forth; ether solvents such as diisopropyl ether, 1,4-dioxane, and so forth; and mixed solvents of the preceding. The following are preferred: aromatic hydrocarbon solvents such as toluene, xylene, and so forth, and aliphatic hydrocarbon solvents such as hexane, octane, isoparaffin, and so forth.

The release modifier of the present invention can be used in the form of a release modifier composition that characteristically incorporates at least one olefin represented by structural formulas (1) and (2) below. The incorporation of such an olefin in the release modifier of the present invention enables facile adjustment of the viscosity of the release modifier composition and thereby enables an easier incorporation into the releasable organopolysiloxane. These olefins are known release modifiers and are very useful additives from the standpoint of enabling control of the heavy release properties of the release modifier composition according to the present invention into a desired range.

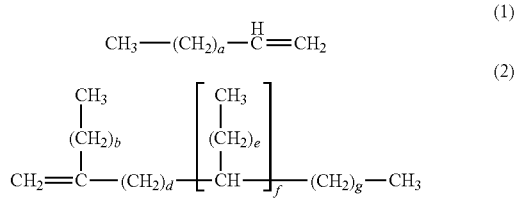

$$CH_3-(CH_2)_a-\overset{H}{C}=CH_2 \quad (1)$$

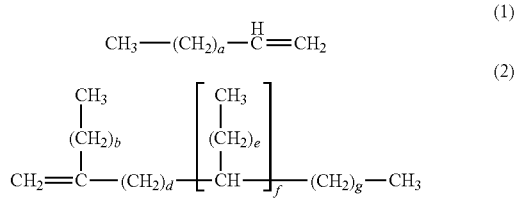

(In the formulas, a is a number in the range from 1 to 27; d and f are each independently numbers in the range from 0 to 20; b and e are each independently numbers in the range from 1 to 12; and g is a number in the range from 3 to 14.)

The olefin components with the structures given above are liquids or solids at room temperature (25° C.); they may be solids at room temperature when the number of carbons exceeds 20 and are highly volatile when the number of carbons is less than 6. As a consequence, when used for the viscosity modification of the release modifier, a $C_{6-20}$, preferably a $C_{8-18}$, and more preferably a $C_{10-16}$ olefin that is liquid at room temperature is preferably used. A solid olefin having more than 20 carbons can also be used by dispersion in an organic solvent as described above. Combinations of two or more olefins containing different numbers of carbons may also be used. A straight-chain olefin+branched olefin combination may also be used.

Specific preferred examples of this olefin are straight-chain olefins selected from the group consisting of 1-dodecene, 1-tridecene, 1-tetradecene, 1-pentadecene, 1-hexadecene, 1-heptadecene, and 1-octadecene and branched olefins represented by the following structural formulas (3) and (4).

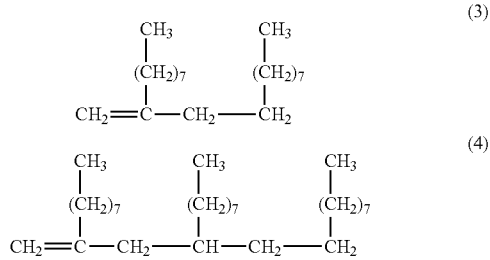

The release modifier composition of the present invention incorporates at least one type of olefin with structural formula (1) or (2). While there is no particular limitation on the amount of olefin incorporation, 0.1 to 50 weight parts of this olefin is preferably incorporated per 100 weight parts of the organopolysiloxane resin-organopolysiloxane condensation reaction product. The incorporation of 0.5 to 20 weight parts of olefin is particularly preferred from the standpoints of the viscosity and heavy release properties of the release modifier composition.

The release coating organopolysiloxane composition containing the inventive release modifier or release modifier composition is described in the following.

The release coating organopolysiloxane composition of the present invention comprises (A) 1 to 20 weight parts of the release modifier or release modifier composition described hereinabove, (B) 95 to 70 weight parts of organopolysiloxane that contains at least two silicon-bonded alkenyl groups in each molecule, (C) organohydrogenpolysiloxane that has at least two silicon-bonded hydrogen atoms in each molecule, in an amount that provides a value of 0.3 to 5.0 for the molar ratio between the [silicon-bonded hydrogen in component (C)] and the [alkenyl in component (B)], and (D) a catalytic quantity of a platinum hydrosilylation reaction catalyst. Here, the sum (total quantity) of components (A) to (D) is 100 weight parts.

Component (B) is the main component of the cured release coating layer-forming organopolysiloxane composition of the present invention and is organopolysiloxane that contains at least two silicon-bonded alkenyl groups in each molecule. Component (B) crosslinks with component (C) through a hydrosilylation reaction under the catalytic activity of component (D). Component (B) typically has a straight-chain configuration, but may have a branched-chain configuration.

The silicon-bonded alkenyl group is preferably $C_{2-10}$ alkenyl and may be exemplified by vinyl, allyl, butenyl, pentenyl, hexenyl, heptenyl, octenyl, nonenyl, and decenyl. The vinyl group is preferred, followed by allyl and hexenyl. The alkenyl content in the molecule is preferably from 0.1 to 20 mol % of the total silicon-bonded organic groups in each molecule, wherein the range of 0.2 to 10.0 mol % is more preferred and the range of 0.5 to 5.0 mol % is particularly preferred. A cure rate sufficient for practical applications may not be obtained when the alkenyl content is less than the indicated lower limit, while the release force of the cured coating may be too large when the indicated upper limit is exceeded. The alkenyl may be bonded to silicon in molecular chain terminal position, to silicon in side chain position, or to silicon in both molecular chain terminal position and side chain position.

The non-alkenyl silicon-bonded organic groups in component (B) can be exemplified by alkyl such as methyl, ethyl, propyl, butyl, hexyl, heptyl, octyl, nonyl, decyl, and so forth; aryl such as phenyl, tolyl, xylyl, and so forth; aralkyl such as benzyl, phenethyl, and so forth; halogenated alkyl such as 3-chloropropyl, perfluoroalkyl with the formula $C_mF_{2m+1}CH_2CH_2-$ (m is an integer from 1 to 10, for example, 3,3,3-trifluoropropyl and pentafluorobutyl), and so forth; perfluoroetherified alkyl as represented by the formulas $F[CF(CF_3)CF_2O]_nCF(CF_3)CF_2OCH_2CH_2CH^2-$, $F[CF(CF_3)CF_2O]_nCF(CF_3)CH_2OCH_2CH_2CH_2-$, $F[CF(CF_3)CF_2O]_nCF_2CF_3CH_2CH_2-$, $F[CF(CF_3)CF_2O]_nCF(CF_3)CH_2CH_2-$, $C_mF_{2m+1}CH_2CH_2OCH_2CH_2CH_2-$, and $C_mF_{2m+1}CH_2OCH_2CH_2CH-$ (n is an integer from 1 to 5 and m is an integer from 3 to 10); and cyanoethyl. Viewed from the standpoints of ease of synthesis and the properties of the cured coating, alkyl, phenyl, and perfluoroalkyl (wherein at least 50 mol % is methyl) are preferred. In a more preferred embodiment, all of the non-alkenyl organic groups are methyl group.

Component (B) can be exemplified by the following: dimethylpolysiloxane chain-stopped at both molecular chain terminals by dimethylvinylsiloxy, dimethylsiloxane.methylvinylsiloxane copolymer chain-stopped at both molecular chain terminals by trimethylsiloxy, dimethylsiloxane.methylvinylsiloxane copolymer chain-stopped at both molecular chain terminals by dimethylvinylsiloxy, dimethylsiloxane.methylvinylsiloxane copolymer chain-stopped at both molecular chain terminals by dimethylethoxysiloxy, dimethylsiloxane.methylphenylsiloxane copolymer chain-stopped at both molecular chain terminals by dimethylvinylsiloxy, and dimethylsiloxane.methyl(3,3,3-trifluoropropyl)siloxane copolymer chain-stopped at both molecular chain terminals by dimethylvinylsiloxy gropus.

Component (B) may be a liquid or gum at ambient temperature, but must be a liquid when used for the preparation of a solventless composition and preferably is 50 to 10,000 mPa·s and more preferably is 50 to 2,000 mPa·s. When component (B) is a gum at ambient temperature, it must be dissolved in an organic solvent such as xylene, toluene, and so forth.

Component (C) is an organohydrogenpolysiloxane that has at least two silicon-bonded hydrogens in each molecule and preferably is organohydrogenpolysiloxane that has a viscosity at 25° C. of 1 to 1,000 mPa·s, contains at least two silicon-bonded hydrogens in each molecule, and has $C_{1-8}$ alkyl or phenyl for its silicon-bonded organic groups. Component (C) must have at least two silicon-bonded hydrogens in the molecule in order to undergo the crosslinking reaction with component (B) and preferably has at least three silicon-bonded hydrogens in each molecule.

The bonding position of the silicon-bonded hydrogen is not particularly limited, and the silicon-bonded hydrogen may be bonded, for example, in molecular chain terminal position, side chain position, or in both positions. The silicon-bonded hydrogen content is preferably 0.1 to 20 weight % and more preferably is 0.5 to 18 weight %.

The silicon-bonded organic groups can be, for example, phenyl or $C_{1-8}$ alkyl such as methyl, ethyl, propyl, butyl, and octyl, but preferably at least 50% of the total number of silicon-bonded organic groups are $C_{1-8}$ alkyl groups. Methyl is preferred among these alkyl groups from the standpoint of ease of production and the properties of the cured coating. The molecular structure of component (C) can be exemplified by straight chain, branched chain, and cyclic.

The viscosity of component (C) at 25° C. is 1 to 1,000 mPa·s and preferably is 5 to 500 mPa·s. When the viscosity at 25° C. is less than the indicated lower limit, component (C) is prone to evaporate from the organopolysiloxane composition, while a long cure time is required for the organopolysiloxane composition when the viscosity at 25° C. exceeds the indicated upper limit.

Component (C) can be more specifically exemplified by the following: methylhydrogenpolysiloxane chain-stopped at both terminals by trimethylsiloxy, dimethylsiloxane.methylhydrogensiloxane copolymer chain-stopped at both terminals by trimethylsiloxy, dimethylsiloxane.methylhydrogensiloxane copolymer chain-stopped at both terminals by dimethylhydrogensiloxy, cyclic methylhydrogenpolysiloxane, cyclic methylhydrogensiloxane.dimethylsiloxane copolymer, tris(dimethylhydrogensiloxy)methylsilane, and tetra(dimethylhydrogensiloxy)silane.

The mixing proportion between components (B) and (C) should provide a value of 0.3 to 5.0 for the molar ratio between the [silicon-bonded hydrogen in component (C)] and the [alkenyl in component (B)]. The curability is prone to decline when this molar ratio is less than 0.3, and more specifically the cure rate becomes too slow and the resulting cured coating will be weak. When this molar ratio is larger than 5.0, the releasability from tacky substances undergoes a decline and blocking readily occurs between one cured coating and another. In addition, a large temporal variation in the release force may occur, to the point that the practical usefulness is lost. Viewed from these perspectives, this ratio is preferably 0.7 to 2.0.

Component (D) is a platinum hydrosilylation reaction catalyst and functions to promote hydrosilylation-based crosslinking and curing between components (B) and (C). This platinum catalyst can be exemplified by chloroplatinic acid; alcohol solutions of chloroplatinic acid; aldehyde solutions of chloroplatinic acid; olefin complexes of chloroplatinic acid; chloroplatinic acid/diketone complexes; platinum/alkenylsiloxane complexes such as chloroplatinic acid/divinyltetramethyldisiloxane complexes, chloroplatinic/tetramethyltetravinylcyclotetrasiloxane complexes, platinum/divinyltetramethyldisiloxane complexes, platinum/tetramethyltetravinylcyclotetrasiloxane complexes, and so forth; platinum tetrachloride; finely divided platinum; finely divided platinum supported on alumina micropowder or silica micropowder; platinum black; platinum/olefin complexes; platinum/diketone complexes; and platinum/carbonyl complexes.

The following are particularly preferred based on considerations of the compatibility with components (B) and (C), the solubility in organic solvent, and the capacity to promote the curing reaction: chloroplatinic acid and platinum/alkenylsiloxane complexes such as chloroplatinic acid/divinyltetramethyldisiloxane complexes, chloroplatinic acid/tetramethyltetravinylcyclotetrasiloxane complexes, platinum/divinyltetramethyldisiloxane complexes, platinum/tetramethyltetravinylcyclotetrasiloxane complexes, and so forth.

Component (C) is incorporated in a catalytic quantity, i.e., in a quantity sufficient to bring about the cure of the cured release coating layer-forming organopolysiloxane composition of the present invention. When one considers the curability of the composition, the adhesiveness to substrate, and the economics, the range of 5 to 1000 ppm as the amount of platinum metal per 100 weight parts of the total of components (B) and (C) is preferred while the range of 10 to 300 ppm as the amount of platinum metal per 100 weight parts of the total of components (B) and (C) is more preferred.

Because the cured release coating layer-forming organopolysiloxane composition of the present invention cannot be thinly coated on a sheet-form substrate when component (B) is a gum, the composition may in this case be used in the form of the solvent-based cured release coating layer-forming organopolysiloxane composition obtained by the additional incorporation of (E) 10 to 3000 weight parts of organic solvent per 100 weight parts of the total of components (A) to (D).

Component (E) may be any organic solvent that can dissolve components (A) to (D) to homogeneity and that does not hinder curing. Component (E) can be specifically exemplified by aromatic hydrocarbons such as toluene, xylene, and so forth; aliphatic hydrocarbons such as pentane, hexane, heptane, and so forth; halogenated hydrocarbons such as trichloroethylene, perchloroethylene, trifluoromethylbenzene, 1,3-bis(trifluoromethyl)benzene, methylpentafluorobenzene, and so forth; and by ethyl acetate, methyl ethyl ketone, and methyl isobutyl ketone. Preferred thereamong from the standpoints of solubility, safety, and economics are toluene, xylene, and n-hexane.

In addition to the components described in the preceding, the cured release coating layer-forming organopolysiloxane composition of the present invention preferably contains a hydrosilylation reaction inhibitor (F) in order to provide curability upon the application of heat while improving the storage stability by inhibiting gelation and curing at ambient temperature. This hydrosilylation reaction inhibitor can be exemplified by acetylenic compounds, ene-yne compounds, organonitrogen compounds, organophosphorus compounds, and oxime compounds and can be specifically exemplified by alkynyl alcohols such as 3-methyl-1-butyn-3-ol (=methylbutynol), 3,5-dimethyl-1-hexyn-3-ol, 3-methyl-1-pentyn-3-ol, phenylbutynol, and so forth; and by 3-methyl-3-penten-1-yne, 3,5-dimethyl-1-hexyn-3-ene, 1-ethynyl-1-cyclohexanol, benzotriazole, and methylvinylcyclosiloxane. The amount of incorporation of this addition reaction inhibitor is generally from 0.001 to 5 weight parts per 100 weight parts of the total quantity of components (A) to (D), but should be selected as appropriate in view of the nature of the addition reaction inhibitor, the properties and content of the platinum hydrosilylation reaction catalyst, the amount of alkenyl in component (B), and the amount of silicon-bonded hydrogen in component (C).

Various other optional components may be added as necessary to the cured release coating layer-forming organopolysiloxane composition of the present invention. The following, for example, may be added: stabilizers, heat resistance improvers, fillers, pigments, leveling agents, agents that improve the adhesion to substrate, antistatic agents, defoamers, nonreactive organopolysiloxane, and so forth. In accordance with the process for applying this composition in the production phase, known thickeners, for example, silica micropowder, may also be incorporated in order to realize a desired coated film thickness.

Viewed from the perspective of the coatability on a sheet-form substrate, the viscosity of the cured release coating layer-forming organopolysiloxane composition of the present invention as a whole is preferably 50 to 2,000 mPa·s at 25° C. in the case of the solventless composition and is preferably 50 to 5,000 mPa·s at 25° C. in the case of the solvent-based composition.

The release coating organopolysiloxane composition of the present invention can be produced simply by mixing the previously described components to homogeneity. There is no particular limitation on the sequence in which the individual components are incorporated. However, in those instances in which the composition will not be used immediately after mixing, a component (A)+(B) mixture is preferably stored separately from a component (C)+(D) mixture and the two are then mixed just before use.

A cured coating layer that exhibits an appropriate release resistance from tacky substances can be formed on the surface of various sheet-form substrates by the uniform application of the hereinabove-described cured release coating layer-forming organopolysiloxane composition of the present invention on the surface of the sheet-form substrate and the application of heat under conditions sufficient to cause crosslinking by the hydrosilylation reaction between components (B) and (C). A characteristic feature of the thusly formed cured coating layer is that it exhibits an excellent adhesion for sheet-form substrates. This sheet-form substrate can be exemplified by paper, glassine paper, cardboard, clay-coated paper, polyolefin-laminated paper and particularly polyethylene-laminated paper, plastic films obtained from synthetic resins (e.g., polyester, polypropylene, polyethylene, polyvinyl chloride, polytetrafluoroethylene, polyimide, and so forth), fabrics and textiles, synthetic fibers, metal foils, and so forth.

Known methods can be used to coat the inventive composition on a substrate as described above, for example, roll coating, gravure coating, wire doctor coating, air knife coating, dip coating, and so forth. Desirable quantities of application are 0.01 to 100 g/m² and the thickness of the coated film is approximately 0.1 to 100 μm. The entire surface of the substrate may be coated or partial application may be carried out at locations where releasability is required.

Suitable curing temperatures for the release coating organopolysiloxane composition of the present invention residing on the sheet-form substrate are generally 50 to 200° C., but temperatures above 200° C. may be used when the sheet-form substrate has good heat resistance. There are no particular limitations on the heating method, which can be exemplified by heating in a convection oven, passage through a long heating oven, or exposure to thermal radiation from an infrared lamp or halogen lamp. Curing may also be carried out by combining the application of heat with exposure to ultraviolet radiation. The silicone composition is preferably cured at 50 to 200° C., in which case the heating time can be 1 second to 5 minutes.

Various pressure-sensitive adhesives and adhesives can be used for the tacky or pressure-sensitive adhesive material used with the release sheet yielded by the application and cure of the release coating organopolysiloxane composition of the present invention. Examples in this regard are acrylic resin pressure-sensitive adhesives, rubber-based pressure-sensitive adhesives, silicone pressure-sensitive adhesives, acrylic resin adhesives, synthetic rubber-based adhesives, silicone adhesives, epoxy resin adhesives, and polyurethane adhesives. Other examples of the tacky material are asphalt, tacky food products such as mochi (Japanese rice cake), glues and pastes, and birdlime.

EXAMPLES

The present invention is specifically described in the following using examples and comparative examples; however, the present invention is not limited to the following examples. In the examples that follow, parts denotes weight parts in all instances, while the viscosity is the value measured at 25° C. In the formulas, M is the monofunctional siloxane unit represented by $(CH_3)_3SiO_{1/2}$ or $(CH_3)_2(OH)SiO_{1/2}$; $M^{Vi}$ is the monofunctional siloxane unit represented by $(CH_3)_2(CH_2=CH)SiO_{1/2}$; $M^{OH}$ is the monofunctional siloxane unit represented by $(CH_3)_2(OH)SiO_{1/2}$; D is the difunctional siloxane unit represented by $(CH_3)_2SiO_{1/2}$; and Q is the tetrafunctional siloxane unit represented by $SiO_2$. The following methods were used to evaluate the curing rate of the release coating organopolysiloxane composition, the adhesiveness to substrate of the cured coating therefrom, and the release resistance of the cured coating therefrom versus tacky substance.

[Viscosity]

The viscosity was measured at 25° C. using a digital display viscometer (Vismetron VDA2 from Shibaura Systems Co., Ltd.) at a rotor rotation rate of 30 rpm with a number 2 rotor installed.

[Hydroxyl Group (Silanol Group) Content]

The hydroxyl group content in the organopolysiloxane resin or release modifier was quantitated using a Fourier-transform infrared spectrophotometer (FT-IR, NEXUS 670 from Thermo Fisher Scientific Inc.) based on the absorption strength for the characteristic absorption peak of the —OH stretching vibration assigned to hydroxyl (silanol) at an absorption wavelength of 3200-3800 cm-1. In specific terms, the hydroxyl group content in the sample was determined using the working curve method (trimethylsilanol with its known hydroxyl group content was used as the standard sample) from the absorption strength of this peak provided by the measurement sample.

[Method of Curing the Silicone Composition]

Using a printability tester, the silicone composition was coated immediately after its preparation at 0.6 to 0.8 g/m2 on a polyethylene-laminated paper substrate and this was then heated for 30 seconds in a 130° C. convection dryer to provide a silicone separator (release paper), which was used in the following measurements.

[Release Force]

The silicone separator obtained according to the above-described "Method of curing the silicone composition" was held for 20 hours at 25° C., after which it was coated with a solvent-based acrylic pressure-sensitive adhesive (BPS-5127 from Toyo Ink Mfg. Co., Ltd.) followed by heating for 2 minutes at 70° C. Coated paper was then adhered on the side that had been coated/treated with the pressure-sensitive adhesive and a 2.5-cm width was cut out and held for 24 hours at 25° C. to provide a sample or for 3 days at 70° C. to provide a sample. Using a tensile tester, the surface paper (high quality paper) of the sample was peeled in opposite directions at an angle of 180° and a peel rate of 0.3 m/minute or 100 m/minute to measure the force required for release, which was designated as the initial release force (N).

[Evaluation of the Residual Adhesiveness]

Nitto 31B Polyester Tape (product name, from Nitto Denko Corporation) was adhered on the surface of the silicone separator obtained according to the previously described "Method of curing the silicone composition"; a load of 1976 Pa was applied; heating was carried out for 20 hours at 70° C., after which the tape was peeled off and adhered on a stainless steel plate; and, using a tensile tester, the force required to peel the thusly treated tape from the stainless steel plate was measured by the same method as in the initial release force test and was designated as the adhesive strength (A).

Similarly, Nitto 31B Polyester Tape was adhered on a Teflon (registered trademark, product of Du Pont) plate; a load of 1976 Pa was applied; heating was carried out for 20 hours at 70° C., after which the tape was peeled off and adhered on a stainless steel plate; and, using a tensile tester, the force required to peel the thusly treated tape from the stainless steel plate was measured by the same method as in the initial release force test to give the blank adhesive strength (B) (no contact with the cured silicone surface). The residual adhesiveness (%) was determined using the following formula. Residual adhesiveness (%)=adhesive strength (A)/ blank adhesive strength (B)×100

Synthesis Example 1

[Production of Release Modifier (1)]

The following starting materials were charged to a 2-liter separable flask equipped with a thermometer, condenser, and stirrer and were stirred for 30 minutes.

(a1-1) methylpolysiloxane resin:

| $M_{0.74}Q_1$ (OH quantity = 0.74%) | 300 g |
| --- | --- |

(a2-1) straight-chain dimethylpolysiloxane chain-stopped by hydroxydimethylsiloxy at both molecular chain terminals:

| $M^{OH}D_{330}M^{OH}$ | 128 g |
| --- | --- |
| xylene | 444 g |

After these starting materials had been mixed to homogeneity, the temperature was raised to 40° C.; 5 g of 28% aqueous ammonia solution (a3) was added; and a reaction was carried out for approximately 5 hours. This was followed by the installation of a water trap; the temperature was raised to 140° C.; the water of condensation and ammonia were removed over 2 hours; and cooling to room temperature then yielded a xylene solution of a release modifier (1) comprising a methylpolysiloxane resin-dimethylpolysiloxane condensate.

The hydroxyl group (silanol group) content of the obtained release modifier (1) is given in Table 1. In addition, in order to adjust the viscosity, 428 g of a dimethylvinylsiloxy chain-stopped straight-chain dimethylpolysiloxane ($M^{Vi}D_{60}M^{Vi}$) was added to the xylene solution of the release modifier (1). After mixing to homogeneity in about 30 minutes, the xylene was removed by stripping to obtain a dimethylpolysiloxane solution of the release modifier (1). The viscosity of this solution is given in Table 1. The content in this solution of the release modifier (1) comprising the methylpolysiloxane resin-dimethylpolysiloxane condensate was 50 weight %.

[Synthesis Example 2]

[Production of Release Modifier (2)]

The xylene solution of a release modifier (2) was obtained by proceeding in the same manner as in Release Modifier Synthesis Example 1, but in this case using 256 g for the amount of addition of component (a2-1) (=$M^{OH}D_{330}M^{OH}$) in Synthesis Example 1. In addition, in order to adjust the viscosity, 556 g of a dimethylvinylsiloxy chain-stopped straight-chain dimethylpolysiloxane ($M^{Vi}D_{60}M^{Vi}$) was added to the xylene solution of the release modifier (2). After mixing to homogeneity in about 30 minutes, the xylene was removed by stripping to obtain a dimethylpolysiloxane solution of the release modifier (2) (release modifier (2) content=50 weight %).

The hydroxyl group (silanol group) content of release modifier (2) is given in Table 1. The viscosity of the dimethylpolysiloxane solution of release modifier (2) is also shown in Table 1.

Synthesis Example 3

[Production of Release Modifier (3)]

The xylene solution of a release modifier (3) and the dimethylpolysiloxane solution of the release modifier (3) were obtained by proceeding as in Release Modifier Synthesis Example 1, but in this case replacing component (a2-1) in Synthesis Example 1 with the following.

| (a2-2) $M^{OH}D_{400}M^{OH}$ | 128 g |
| --- | --- |

The hydroxyl group (silanol group) content of this release modifier (3) is given in Table 1. The viscosity of the dimethylpolysiloxane solution of release modifier (3) is also shown in Table 1 (release modifier (3) content=50 weight %).

Synthesis Example 4

[Production of Release Modifier (4)]

The xylene solution of a release modifier (4) and the dimethylpolysiloxane solution of the release modifier (4) were obtained by proceeding as in Release Modifier Synthesis Example 1, but in this case replacing component (a2-1) in Synthesis Example 1 with the following.

| (a2-3) $M^{OH}D_{620}M^{OH}$ | 128 g |
| --- | --- |

The hydroxyl group (silanol group) content of this release modifier (4) is given in Table 1. The viscosity of the dimethylpolysiloxane solution of release modifier (4) is also shown in Table 1 (release modifier (4) content=50 weight %).

Synthesis Example 5

[Production of Release Modifier (5)]

After the xylene solution of release modifier (1) had been obtained by proceeding as in Release Modifier Synthesis Example 1, 4 g hexamethyldisilazane (a4) was added at room temperature and a portion of the silanol in release modifier (1)

was then chain-stopped by the trimethylsilyl group by reacting for 2 hours at 85° C. The solution provided by this reaction was designated the xylene solution of release modifier (5). In order to adjust the viscosity, 428 g of a dimethylvinylsiloxy chain-stopped straight-chain dimethylpolysiloxane ($M^{Vi}D_{60}M^{Vi}$) was added and, after mixing to homogeneity in about 30 minutes, the xylene was removed by stripping to obtain a dimethylpolysiloxane solution of the release modifier (5) (release modifier (5) content=50 weight %). The hydroxyl group (silanol group) content of release modifier (5) is given in Table 1. The viscosity of the dimethylpolysiloxane solution of release modifier (5) is also shown in Table 1.

Synthesis Example 6

[Production of Release Modifier (6)]

The xylene solution of a release modifier (6) and the dimethylpolysiloxane solution of the release modifier (6) were obtained by proceeding as in Release Modifier Synthesis Example 5, but in this case using 8 g for the quantity of addition of the hexamethyldisilazane (component (a4)) in Synthesis Example 5. The hydroxyl group (silanol group) content of this release modifier (6) is given in Table 1. The viscosity of the dimethylpolysiloxane solution of release modifier (6) is also shown in Table 1 (release modifier (6) content=50 weight %).

[Synthesis Example 7]

[Production of Release Modifier (7)]

The xylene solution of a release modifier (7) and the dimethylpolysiloxane solution of the release modifier (7) (release modifier (7) content=50 weight %) were obtained by proceeding as in Release Modifier Synthesis Example 5, but in this case using 20 g for the quantity of addition of the hexamethyldisilazane (component (a4)) in Synthesis Example 5. The hydroxyl group (silanol group) content of this release modifier (7) is given in Table 1. The viscosity of the dimethylpolysiloxane solution of release modifier (7) is also shown in Table 1.

Synthesis Example 8

[Production of Release Modifier (8)]

The xylene solution of a release modifier (8) was obtained by proceeding as in Release Modifier Synthesis Example 1, but in this case changing the quantity of addition of components (a1-1) and (a2-1) as shown below.

| (a1-1) $M_{0.74}Q_1$ (OH quantity = 0.74%) | 75 g |
|---|---|
| (a2-1) $M^{OH}D_{330}M^{OH}$ | 256 g |

In addition, in order to adjust the viscosity, 331 g of a dimethylvinylsiloxy chain-stopped straight-chain dimethylpolysiloxane ($M^{Vi}D_{60}M^{Vi}$) was added to the xylene solution of the release modifier (8) and, after mixing to homogeneity in about 30 minutes, the xylene was removed by stripping to obtain a dimethylpolysiloxane solution of the release modifier (8) (release modifier (8) content=50 weight %). The hydroxyl group (silanol group) content of this release modifier (8) is given in Table 1. The viscosity of the dimethylpolysiloxane solution of release modifier (8) is also shown in Table 1.

Synthesis Example 9

[Production of Release Modifier (9)]

The xylene solution of a release modifier (9) was obtained by proceeding as in Release Modifier Synthesis Example 1, but in this case replacing component (a2-1) in Synthesis Example 1 with the following.

| (a2-1)' $M^{OH}D_{2200}M^{OH}$ | 128 g |
|---|---|

In addition, in order to adjust the viscosity, 1112 g of a dimethylvinylsiloxy chain-stopped straight-chain dimethylpolysiloxane ($M^{Vi}D_{60}M^{Vi}$) was added to the xylene solution of the release modifier (9). After mixing to homogeneity in about 30 minutes, the xylene was removed by stripping to obtain a dimethylpolysiloxane solution of the release modifier (9) (release modifier (9) content=33 weight %). The hydroxyl group (silanol group) content of release modifier (9) is given in Table 1. The obtained dimethylpolysiloxane solution of release modifier (9) had a very high viscosity, as reported in Table 1, despite the dissolution in twice as much dimethylpolysiloxane ($M^{Vi}D_{60}M^{Vi}$) as for the release modifiers in Synthesis Examples 1 to 8.

Production Example 1

[Production of a Release Modifier Composition Using the Release Modifier of Synthesis Example 1]

2 weight parts of branched olefin with the following structural formula (3) was added to 100 weight parts of the dimethylpolysiloxane solution of release modifier (1) (release modifier (1) content=50 weight %) that was obtained in Release Modifier Synthesis Example 1 and the dimethylpolysiloxane solution of a release modifier composition (1) comprising release modifier (1) and the branched olefin was then obtained by mixing to homogeneity. As reported in Table 1, the viscosity of this dimethylpolysiloxane solution was substantially less than in the absence of the branched olefin.

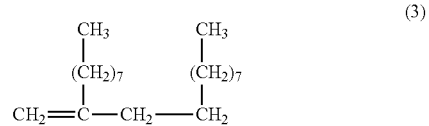

(3)

Production Example 2

[Production of a Release Modifier Composition Using the Release Modifier of Synthesis Example 6]

2 weight parts of branched olefin with the preceding structural formula (3) was added to 100 weight parts of the dimethylpolysiloxane solution of release modifier (6) (release modifier (6) content=50 weight %) that was obtained in Release Modifier Synthesis Example 6 and the dimethylpolysiloxane solution of a release modifier composition (2) comprising release modifier (6) and the branched olefin was then obtained by mixing to homogeneity. As reported in Table 1, the viscosity of this dimethylpolysiloxane solution was substantially less than in the absence of the branched olefin.

Reference Example 1

The following starting materials were introduced into a container and a dimethylpolysiloxane solution (1) of methylpolysiloxane resin was then obtained by stirring at room temperature until homogeneity was reached. The viscosity of this solution was 2,000 mPa·s. The content of the methylpolysiloxane resin in this solution is 50 weight %.

| | |
|---|---|
| methylpolysiloxane resin: $M_{0.65}Q_1$ (OH quantity = 0.1%) | 300 g |
| dimethylpolysiloxane: $M^{Vi}D_{60}M^{Vi}$ | 300 g |

Reference Example 2

The following starting materials were introduced into a container and a dimethylpolysiloxane solution (2) of methylpolysiloxane resin was then obtained by stirring at room temperature until homogeneity was reached. The viscosity of this solution was 2,000 mPa·s. The content of the methylpolysiloxane resin in this solution is 50 weight %.

| | |
|---|---|
| methylpolysiloxane resin: $M'_{0.70}Q_1$ (OH quantity = 0.1%, Vi quantity = 1.9%) | 300 g |
| dimethylpolysiloxane: $M^{Vi}D_{60}M^{Vi}$ | 300 g |

(In the formulas, M, D, and Q are the same siloxane units as defined above and M' is the monofunctional siloxane unit represented by $(CH_3)_3SiO_{1/2}$, $(CH_3)_2(CH_2=CH)SiO_{1/2}$, or $(CH_3)_2(OH)SiO_{1/2}$ and containing vinyl (Vi) and hydroxyl (OH).)

Reference Example 3

The following starting materials were introduced into the same equipment as in Synthesis Example 1; component (a3) was added as in Synthesis Example 1; and a condensation reaction was run. The condensation reaction product underwent gelation in this case. As a consequence, this methylpolysiloxane resin-dimethylpolysiloxane condensate could not be used as a release modifier.

| | |
|---|---|
| (a1-1) $M_{0.74}Q_1$ (OH quantity = 0.74%) | 300 g |
| (a2-2)'$M^{OH}D_{80}M^{OH}$ | 128 g |
| Xylene | 444 g |

The dimethylpolysiloxane solutions (1 to 7) of the release modifiers (1 to 7) obtained in Synthesis Examples 1 to 7 were used in the examples of the present invention. The dimethylpolysiloxane solution of the release modifier composition (1) obtained in Production Example 1 and the dimethylpolysiloxane solution of the release modifier composition (2) obtained in Production Example 2 were likewise used in the examples of the present invention. The dimethylpolysiloxane solutions (8, 9) of the release modifiers (8, 9) obtained in Synthesis Examples 8 and 9 and the dimethylpolysiloxane solutions (1, 2) of methylpolysiloxane resin that were prepared in Reference Examples 1 and 2 were used in the comparative examples of the present invention.

TABLE 1

| | Syn. Ex. 1 | Syn. Ex. 2 | Syn. Ex. 3 | Syn. Ex. 4 | Syn. Ex. 5 | Syn. Ex. 6 | Syn. Ex. 7 | Prod. Ex. 1 | Prod. Ex. 2 | Syn. Ex. 8 | Syn. Ex. 9 | Ref. Ex. 3 |
|---|---|---|---|---|---|---|---|---|---|---|---|---|
| (a1) (g) | | | | | | | | | | | | |
| $M_{0.74}Q_1$ (OH quantity = 0.74%) | 300 | 300 | 300 | 300 | 300 | 300 | 300 | | | 75 | 300 | 300 |
| (a2) (g) | | | | | | | | | | | | |
| $M^{OH}D_{330}M^{OH}$ | 128 | 256 | | | 128 | 128 | 128 | | | 256 | | |
| $M^{OH}D_{440}M^{OH}$ | | | 128 | | | | | | | | | |
| $M^{OH}D_{620}M^{OH}$ | | | | 128 | | | | | | | | |
| (a2)' (g) | | | | | | | | | | | | |
| $M^{OH}D_{2200}M^{OH}$ | | | | | | | | | | | 256 | |
| $M^{OH}D_{80}M^{OH}$ | | | | | | | | | | | | 128 |
| (a3) (g) | | | | | | | | | | | | |
| 28% aqueous ammonia solution | 5 | 5 | 5 | 5 | 5 | 5 | 5 | | | 5 | 5 | 5 |
| (a4) (g) | | | | | | | | | | | | |
| hexamethyldisilazane (g) | | | | | 4 | 8 | 20 | | | | | |
| xylene (g) | 444 | 444 | 444 | 444 | 444 | 444 | 444 | | | 444 | 444 | 444 |
| $M^{Vi}D_{60}M^{Vi}$ (g) | 428 | 1112 | 428 | 428 | 428 | 428 | 428 | | | 331 | 556 | — |
| siloxane solution of Syn. Example 1 (g) | | | | | | | | 100 | | | | |
| siloxane solution of Syn. Example 6 (g) | | | | | | | | | 100 | | | |
| branched olefin with struct. form. (3) (g) | | | | | | | | 2 | 2 | | | |
| comp. (a2)/comp. (a1) reaction weight ratio | 0.43 | 0.85 | 0.43 | 0.43 | 0.43 | 0.43 | 0.43 | 0.43 | 0.43 | 3.41 | 0.85 | 0.43 |
| hydroxyl content in the condensation reaction product (weight %) | 0.46 | 0.32 | 0.47 | 0.49 | 0.35 | 0.22 | 0.075 | 0.46 | 0.22 | 0.21 | 0.35 | (*1) |

TABLE 1-continued

|  | Syn. Ex. 1 | Syn. Ex. 2 | Syn. Ex. 3 | Syn. Ex. 4 | Syn. Ex. 5 | Syn. Ex. 6 | Syn. Ex. 7 | Prod. Ex. 1 | Prod. Ex. 2 | Syn. Ex. 8 | Syn. Ex. 9 | Ref. Ex. 3 |
|---|---|---|---|---|---|---|---|---|---|---|---|---|
| viscosity of the siloxane solution of the release modifier obtained in the particular synthesis example (mPa·s) | 6000 | 13300 | 6500 | 9200 | 5900 | 6200 | 6100 | 2500 | 2600 | 3900 | 38000 | (*1) |

(*1) A release modifier was not obtained due to gelation during the condensation reaction.

Example 1

The following were mixed to homogeneity: (A1) 10 parts of the dimethylpolysiloxane solution (1) of the release modifier (1), (B1) 87 parts of a straight-chain methylvinylpolysiloxane that had a viscosity of 200 mPa·s and that had the vinyl group at both molecular chain terminals and in side chain position (vinyl content=1.1 weight %), (C1) 2.7 parts of a methylhydrogenpolysiloxane chain-stopped at both molecular chain terminals with trimethylsiloxy (viscosity=25 mPa·s, silicon-bonded hydrogen content=1.6 weight %), and 0.30 part 1-ethynyl-1-cyclohexanol. To this mixture was added (D) a chloroplatinic acid.1,3-divinyl-1,1,3,3-tetramethyldisiloxane complex (platinum metal content=0.60 weight %) in an amount that provided 100 ppm of platinum metal, and mixing then yielded a release coating organopolysiloxane composition. The obtained organopolysiloxane composition was coated on the polyethylene-laminated paper and the release resistance and residual adhesiveness were measured; the results are reported in Table 2.

Example 2 to 7

Compositions were produced as in Example 1, but using as component (A1) the dimethylpolysiloxane solutions (2) to (7) of release modifiers (2) to (7) that were obtained in Synthesis Examples 2 to 7. These compositions were coated on the polyethylene-laminated paper and the release resistance and residual adhesiveness were measured; the results are reported in Table 2.

Example 8

A composition was produced as in Example 1, but in this case using as component (A1) the dimethylpolysiloxane solution, obtained in Production Example 1, of release modifier composition (1) comprising release modifier (1) and branched olefin. The composition was coated on the polyethylene-laminated paper and the release resistance and residual adhesiveness were measured; the results are reported in Table 2.

Example 9

A composition was produced as in Example 1, but in this case using as component (A1) the dimethylpolysiloxane solution, obtained in Production Example 2, of release modifier composition (2) comprising release modifier (6) and branched olefin. The composition was coated on the polyethylene-laminated paper and the release resistance and residual adhesiveness were measured; the results are reported in Table 2.

Comparative Examples 1 to 3

Compositions were produced as in Example 1, but using as component (A1) the dimethylpolysiloxane solution (8) of release modifier (8) that was obtained in Synthesis Example 8 or the respective dimethylpolysiloxane solutions (1, 2) of methylpolysiloxane resin that were prepared in Reference Examples 1 and 2. These compositions were coated on the polyethylene-laminated paper and the release resistance and residual adhesiveness were measured; the results are reported in Table 2.

Comparative Example 4

A composition was produced as in Example 1, but using as component (A1) the dimethylpolysiloxane solution (9) of release modifier (9) that was obtained in Synthesis Example 9; however, application at the targeted coating rate could not be carried out in the coating operation with the printability tester.

TABLE 2

| example or comparative example | synthesis example or production example of the release modifier | hydroxyl group content of the release modifier (weight %) | release force (N/2.5 cm) | | | | residual adhesiveness (%) |
|---|---|---|---|---|---|---|---|
| | | | initial | | 70° C./3 days | | |
| | | | 0.3 m/min | 100 m/min | 0.3 m/min | 100 m/min | |
| Example 1 | Synthesis Example 1 | 0.46 | 0.37 | 1.16 | 0.37 | 0.96 | 93 |
| Example 2 | Synthesis Example 2 | 0.32 | 0.32 | 1.21 | 0.35 | 0.98 | 92 |
| Example 3 | Synthesis Example 3 | 0.47 | 0.28 | 1.16 | 0.32 | 1.07 | 92 |
| Example 4 | Synthesis Example 4 | 0.49 | 0.33 | 1.18 | 0.38 | 1.03 | 93 |
| Example 5 | Synthesis Example 5 | 0.35 | 0.35 | 1.12 | 0.36 | 0.93 | 93 |

TABLE 2-continued

| example or comparative example | synthesis example or production example of the release modifier | hydroxyl group content of the release modifier (weight %) | release force (N/2.5 cm) | | | | residual adhesive-ness (%) |
|---|---|---|---|---|---|---|---|
| | | | initial | | 70° C./3 days | | |
| | | | 0.3 m/min | 100 m/min | 0.3 m/min | 100 m/min | |
| Example 6 | Synthesis Example 6 | 0.22 | 0.31 | 1.06 | 0.29 | 0.90 | 90 |
| Example 7 | Synthesis Example 7 | 0.075 | 0.23 | 0.96 | 0.24 | 0.88 | 88 |
| Example 8 | Production Example 1 | 0.46 | 0.36 | 1.15 | 0.35 | 0.99 | 93 |
| Example 9 | Production Example 2 | 0.22 | 0.30 | 1.08 | 0.28 | 0.88 | 91 |
| Comp. Example 1 | Synthesis Example 8 | 0.21 | 0.19 | 0.65 | 0.23 | 0.92 | 94 |
| Comp. Example 2 | Reference Example 1 | 0.10 | 0.17 | 0.60 | 0.24 | 0.60 | 98 |
| Comp. Example 3 | Reference Example 2 | 0.10 | 0.19 | 0.72 | 0.23 | 0.69 | 85 |

As shown in Table 2, the cured release coating layer-forming organopolysiloxane compositions of Examples 1 to 7 provide excellent heavy release properties both initially and after ageing for 3 days at 70° C. In addition, in the case of Examples 8 and 9, which employed release modifier compositions that additionally incorporated a branched olefin as a viscosity modifier, the same excellent heavy release properties as in Examples 1 to 7 were seen and, as shown in Table 1, the handling was made easier because the compositions assumed a lower viscosity.

On the other hand, the initial heavy release properties for Comparative Example 1, which used the release modifier (8) according to Synthesis Example 8 in which the component (a2)/component (a1) ratio during synthesis of the condensate (=release modifier) was outside the range of the present invention, and for Comparative Examples 2 and 3, which used polysiloxane resin that had not been condensation reacted, were in particular inferior to those in the examples.

Industrial Applicability

The release modifier and cured release coating layer-forming organopolysiloxane composition of the present invention are useful for forming a cured coating layer on the surface of a sheet-form substrate wherein this cured coating exhibits heavy release properties and exhibits an excellent releasability versus tacky or pressure-sensitive adhesive substances. Sheet-form substrates having a cured release coating layer of the present invention are well qualified for use in particular for process paper, wrapping or packaging paper for tacky or pressure-sensitive adhesive substances, pressure-sensitive adhesive tapes, pressure-sensitive labels, and so forth.

The invention claimed is:

1. A release modifier composition comprising 100 weight parts of a release modifier comprising an organopolysiloxane resin-organopolysiloxane condensation reaction product obtained by the condensation reaction of
    (a1) 100 weight parts of organopolysiloxane resin essentially comprising the $R^1{}_3SiO_{1/2}$ unit (each $R^1$ in the formula is independently a hydroxyl group, $C_{1-6}$ alkoxy group, or $C_{1-10}$ substituted or unsubstituted monovalent hydrocarbyl group) and $SiO_{4/2}$ unit, wherein the molar ratio of the $R^1{}_3SiO_{1/2}$ unit to the $SiO_{4/2}$ unit is 0.6 to 1.0 and the content of the hydroxyl group or alkoxy group is 0.3 to 2.0 weight% with
    (a2) 20 to 150 weight parts of straight-chain or branched-chain diorganopolysiloxane that has an average degree of polymerization of 100 to 1000 and that has at least one hydroxyl group or $C_{1-6}$ alkoxy group in each molecule in the presence of
    (a3) a condensation reaction catalyst; and
    0.1 to 50 weight parts of at least one type of olefin represented by the following structural formula (1) or (2)

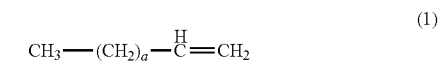

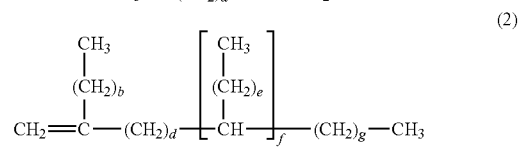

(in the formula, a is a number from 1 to 27; d and f are each independently a number from 0 to 20; b and e are each independently a number from 1 to 12; and g is a number from 3 to 14).

2. The release modifier composition according to claim 1, characterized in that the hydroxyl group content of the organopolysiloxane resin-organopolysiloxane condensation reaction product is 0.05 to 0.80 weight%.

3. The release modifier composition according to claim 1, comprising an organopolysiloxane resin-organopolysiloxane condensation reaction product that is obtained by the condensation reaction of 100 weight parts of component (a1) and 30 to 100 weight parts of component (a2) in the presence of component (a3) and that has a hydroxyl group content of 0.10 to 0.60 weight%.

4. The release modifier composition according to claim 1, comprising an organopolysiloxane resin-organopolysiloxane condensation reaction product obtained by condensation reacting 100 weight parts of component (a1) with 20 to 150 weight parts of component (a2) in the presence of component (a3) and thereafter reacting with 0.1 to 10.0 weight parts of (a4) at least one type of silylating agent.

5. The release modifier composition according to claim 1, wherein component (a2) is a straight-chain diorganopolysiloxane that has two hydroxyl groups in both molecular chain terminals and that is represented by the following structural formula

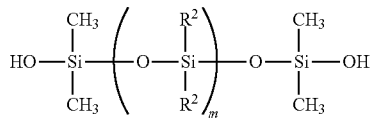

(in the formula, each $R^2$ is independently the hydroxyl group, $C_{1-6}$ alkoxy, or $C_{1-10}$ substituted or unsubstituted monovalent hydrocarbyl that does not contain a carbon-carbon double bond, and m is a number from 200 to 800).

6. The release modifier composition according to claim 4, characterized in that component (a4) is a silazane compound and the organopolysiloxane resin-organopolysiloxane condensation reaction product yielded by the reaction has a hydroxyl group content of 0.10 to 0.60 weight%.

7. A release coating organopolysiloxane composition comprising (A) 1 to 20 weight parts of the release modifier composition according to claim 1,
(B) 95 to 70 weight parts of organopolysiloxane that contains at least two silicon-bonded alkenyl groups in each molecule,
(C) organohydrogenpolysiloxane that has at least two silicon-bonded hydrogen atoms in each molecule, in an amount that provides a value of 0.3 to 5.0 for the molar ratio between the silicon-bonded hydrogen in component (C) and the alkenyl group in component (B), and
(D) a catalytic quantity of a platinum hydrosilylation reaction catalyst.

8. The release coating organopolysiloxane composition according to claim 7, wherein the viscosity of component (B) at 25° C. is 50 to 2000 mPa·s and the composition is a solventless composition.

9. The release coating organopolysiloxane composition according to claim 7, that further comprises (E) 10 to 3000 weight parts of organic solvent.

10. A sheet-form substrate having a cured release coating layer obtained by the cure of the release coating organopolysiloxane composition of claim 7.

* * * * *